(12) United States Patent
Okouchi

(10) Patent No.: US 8,495,819 B2
(45) Date of Patent: Jul. 30, 2013

(54) CHAIN SAW

(75) Inventor: Katsumi Okouchi, Anjo (JP)

(73) Assignee: Makita Corporation, Anjo (JP)

( * ) Notice: Subject to any disclaimer, the term of this patent is extended or adjusted under 35 U.S.C. 154(b) by 77 days.

(21) Appl. No.: 13/320,606

(22) PCT Filed: Apr. 6, 2010

(86) PCT No.: PCT/JP2010/056244
§ 371 (c)(1),
(2), (4) Date: Nov. 15, 2011

(87) PCT Pub. No.: WO2010/134393
PCT Pub. Date: Nov. 25, 2010

(65) Prior Publication Data
US 2012/0066917 A1    Mar. 22, 2012

(30) Foreign Application Priority Data
May 20, 2009   (JP) ................................. 2009-122280

(51) Int. Cl.
*B27B 3/28*      (2006.01)
*B27B 17/14*    (2006.01)

(52) U.S. Cl.
USPC ............................................ 30/386; 83/816

(58) Field of Classification Search
USPC .............. 30/386, 384, 385, 381, 382; 83/788, 83/814, 816, 818
See application file for complete search history.

(56) References Cited

U.S. PATENT DOCUMENTS

| | | |
|---|---|---|
| 1,865,764 A | 7/1932 | Keenon |
| 2,297,378 A | 9/1942 | Wittenberg |
| 2,533,771 A | 12/1950 | De Frees |
| 3,143,441 A | 8/1964 | Coleman et al. |
| 3,194,284 A * | 7/1965 | Walker .............................. 30/386 |
| 3,557,986 A | 1/1971 | Poole |
| 3,621,876 A | 11/1971 | Campbell |

(Continued)

FOREIGN PATENT DOCUMENTS

| | | |
|---|---|---|
| DE | 103 53 737 A1 | 6/2005 |
| EP | 1619004 A1 | 1/2005 |

(Continued)

OTHER PUBLICATIONS

U.S. Appl. No. 13/320,664, filed Nov. 15, 2011 in the name of Katsumi Okouchi.

(Continued)

*Primary Examiner* — Sean Michalski
(74) *Attorney, Agent, or Firm* — Oliff & Berridge, PLC

(57) ABSTRACT

A linear motion mechanism comprises a second rotating shaft having an external thread portion 48a at least at a part of an area in a length direction and an adjusting pin 40 having an opening 60 through which the external thread portion 48a passes. The opening 60 of the adjusting pin 40 has a cross-sectional shape that enables the adjusting pin 40 to move in a radial direction of the second rotating shaft. An inner thread part 62 that engages with and disengages from the external thread portion 48a of the second rotating shaft depending on a position of the adjusting pin 40 is formed on an inner surface of the opening 60. A spring 56 capable of retaining a state in which the external thread portion 48a and the inner thread part 62 engage with each other is arranged on the adjusting pin 40.

3 Claims, 7 Drawing Sheets

U.S. PATENT DOCUMENTS

| | | | | |
|---|---|---|---|---|
| 3,866,320 | A | * | 2/1975 | Progl ............... 30/386 |
| 3,967,645 | A | | 7/1976 | Gregory |
| 4,165,816 | A | | 8/1979 | Tupper |
| 4,271,976 | A | | 6/1981 | Detwiller |
| 4,458,711 | A | | 7/1984 | Flider |
| 4,524,805 | A | | 6/1985 | Hoffman |
| 4,540,103 | A | | 9/1985 | Kasugai et al. |
| 4,835,868 | A | * | 6/1989 | Nagashima ............... 30/386 |
| 4,896,789 | A | | 1/1990 | Federspiel |
| 4,987,740 | A | | 1/1991 | Coleman et al. |
| 5,396,705 | A | * | 3/1995 | Leini ............... 30/386 |
| 5,730,183 | A | | 3/1998 | Kremsler |
| 6,079,582 | A | | 6/2000 | Nickel et al. |
| 6,092,551 | A | | 7/2000 | Bennett |
| 6,237,228 | B1 | * | 5/2001 | Moody ............... 30/381 |
| 6,585,005 | B1 | | 7/2003 | Raftis et al. |
| 6,619,497 | B2 | | 9/2003 | Freiller |
| 6,745,914 | B2 | | 6/2004 | Hagano et al. |
| 6,795,987 | B2 | | 9/2004 | Cornwall |
| 6,877,233 | B1 | | 4/2005 | Franke |
| 7,185,437 | B2 | * | 3/2007 | Behbahany ............... 30/386 |
| 7,481,000 | B2 | * | 1/2009 | Tynes et al. ............... 30/386 |
| 8,233,818 | B2 | | 7/2012 | Sasaki et al. |
| 2004/0148788 | A1 | * | 8/2004 | Behbahany ............... 30/383 |
| 2004/0222224 | A1 | | 11/2004 | Plester |
| 2006/0016081 | A1 | | 1/2006 | Keeton et al. |
| 2006/0075644 | A1 | | 4/2006 | Keeton et al. |
| 2006/0196058 | A1 | | 9/2006 | Warfel et al. |
| 2009/0007439 | A1 | * | 1/2009 | Sugishita ............... 30/386 |
| 2009/0119934 | A1 | * | 5/2009 | Sugishita ............... 30/386 |
| 2009/0241353 | A1 | * | 10/2009 | Ericson et al. ............... 30/386 |
| 2010/0088905 | A1 | * | 4/2010 | Pellenc ............... 30/386 |
| 2010/0284710 | A1 | | 11/2010 | Sasaki et al. |
| 2010/0293797 | A1 | * | 11/2010 | Fisher et al. ............... 30/386 |
| 2012/0012584 | A1 | | 1/2012 | Chameroy et al. |
| 2012/0061115 | A1 | | 3/2012 | Okouchi |

FOREIGN PATENT DOCUMENTS

| | | |
|---|---|---|
| JP | A-50-32516 | 3/1975 |
| JP | U-55-163567 | 11/1980 |
| JP | U-56-52653 | 5/1981 |
| JP | U-58-192003 | 12/1983 |
| JP | U-62-25180 | 2/1987 |
| JP | U-1-69979 | 5/1989 |
| JP | A-9-14475 | 1/1997 |
| JP | B2-3135857 | 2/2001 |
| JP | A-2005-199713 | 7/2005 |
| JP | A-2006-27261 | 2/2006 |
| JP | A-2006-103301 | 4/2006 |
| JP | A-2006-138331 | 6/2006 |
| JP | A-2006-238876 | 9/2006 |

OTHER PUBLICATIONS

U.S. Appl. No. 13/320,705, filed Nov. 15, 2011 in the name of Katsumi Okouchi.
International Search Report issued in International Application No. PCT/JP2010/056243 dated Jun. 22, 2010 (with translation).
Written Opinion of the International Searching Authority issued in International Application No. PCT/JP2010/056243 dated Jun. 22, 2010 (with translation).
International Search Report issued in International Application No. PCT/JP2010/056244 dated Jul. 6, 2010 (with translation).
Written Opinion of the International Searching Authority issued in International Application No. PCT/JP2010/056244 dated Jul. 6, 2010 (with translation).
International Search Report issued in International Application No. PCT/JP2010/056245 dated Jun. 22, 2010 (with translation).
Written Opinion of the International Searching Authority issued in International Application No. PCT/JP2010/056245 Jun. 22, 2010 (with translation).
Feb. 26, 2013 Office Action issued in Japanese Patent Application No. 2009-122280 (with translation).
Feb. 5, 2013 Office Action issued in Russian Patent Application No. 2011151825 (with translation).
Feb. 7, 2013 Office Action issued in Russian Patent Application No. 2011151828 (with translation).
Mar. 1, 2013 Office Action issued in U.S. Appl. No. 13/320,664,.
Apr. 30, 2013 Office Action issued in Japanese Application No. 2009-122281 (with translation).
Apr. 23, 2013 Office Action issued in Japanese Application No. 2009-122279 (with translation).

* cited by examiner

CHAIN SAW

TECHNICAL FIELD

The present specification discloses a chain saw comprising a linear motion mechanism in which a linear motion member moves along a rotating shaft.

BACKGROUND ART

German Patent Specification No. 10353737 discloses a chain saw comprising a linear motion mechanism. In a chain saw of this type, the linear motion mechanism is used to adjust tension of a saw chain. The linear motion mechanism comprises a rotating shaft and a linear motion member that engages with a screw portion of the rotating shaft. The linear motion member engages with a guide bar. The saw chain is provided with tension between the guide bar and a body.

When adjusting the tension of the saw chain, an operator operates a wheel fixed to the rotating shaft. When the operator operates the wheel, the rotating shaft rotates and the linear motion member moves along the rotating shaft. As a result, the guide bar moves reciprocally relative to the body and the tension of the saw chain is adjusted.

SUMMARY OF INVENTION

Technical Problem

When replacing the saw chain, the guide bar is moved widely toward the body until the saw chain becomes detachable from the guide bar and the body. In this case, the operator widely moves the linear motion member that engages with the guide bar relative to the body by rotating the rotating shaft of the linear motion mechanism. However, with the linear motion mechanism, an amount of movement of the linear motion member along the rotating shaft is relatively small compared to an amount of rotation by which the rotating shaft is rotated. Therefore, when moving the linear motion member widely along the rotating shaft, the operator rotates the rotating shaft a large number of times.

An art disclosed in the present specification has been made in consideration of the problem described above. The art enables the linear motion member to move freely along the rotating shaft without having to rotate the rotating shaft when replacing the saw chain.

Solution to Technical Problem

An art disclosed in the present application is realized in a chain saw comprising a linear motion mechanism. The chain saw comprises a chain saw body, the linear motion mechanism, a guide bar and a saw chain. The linear motion mechanism is disposed on the chain saw body. The guide bar is attached to the chain saw body and be capable of moving reciprocally relative to the chain saw body. The saw chain is provided with tension between the chain saw body and the guide bar. The linear motion mechanism comprises a rotating shaft comprising an external thread portion at least at a part of an area in a length direction and a linear motion member comprising an opening through which the external thread portion of the rotating shaft passes. The opening of the linear motion member has a cross-sectional shape that enables the linear motion member to move between a first position and a second position along a radial direction of the rotating shaft. An inner thread is formed on at least a part of an inner surface of the opening. The inner thread engages with the external thread of the rotating shaft when the linear motion member moves to the first position. The engagement between the inner thread and the external thread is released when the linear motion member moves to the second position. The linear motion member comprises a retaining unit capable of retaining the linear motion member at the first position.

According to this linear motion mechanism, during normal operation, the linear motion member may be retained at the first position at which the external thread portion of the rotating shaft and the inner thread of the linear motion member engage with each other. When the rotating shaft rotates in this state, the linear motion member moves reciprocally along to the rotating shaft. On the other hand, according to this linear motion mechanism, the linear motion member may also be retained at the second position at which the engagement between the external thread portion of the rotating shaft and the inner thread of the linear motion member is released. In this state, the linear motion member may be moved freely along the rotating shaft without having to rotate the rotating shaft. Therefore, when finely adjusting the tension of the saw chain, the rotating shaft should be rotated in the state in which the linear motion member is retained at the first position. On the other hand, when replacing the saw chain, the guide bar may be moved without having to rotate the rotating shaft by moving the linear motion member to the second position. As a result, the saw chain may be replaced without having to rotate the rotating shaft a large number of times.

The retaining unit may comprise an elastic member biasing the linear motion member toward the first position. According to this configuration, during the normal operation, the engagement between the external thread portion of the rotating shaft and the inner thread of the linear motion member is maintained by a biasing force of the elastic member. In this state, the linear motion member moves along the rotating shaft according to an amount of rotation of the rotating shaft. In addition, by moving the linear motion member to the second position, an operator may easily release the engagement between the external thread portion of the rotating shaft and the inner thread of the linear motion member. In this state, the linear motion member may be moved freely along the rotating shaft without having to rotate the rotating shaft.

The elastic member may retain the linear motion member in the first position by biasing the linear motion member from the rotating shaft toward an outer side of the chain saw body. The linear motion member may move to the second position by being pressed toward the rotating shaft from the outer side of the chain saw body. According to this configuration, the operator can freely move the linear motion member along the rotating shaft by simply pressing the linear motion member toward the rotating shaft.

Advantageous Effects of Invention

According to the art disclosed in the present specification, in the state in which the linear motion member is retained at the first position, the linear motion member may be moved relative to the rotating shaft by a minute amount by rotating the rotating shaft. On the other hand, when the linear motion member is at the second position, the linear motion member may be moved freely along the rotating shaft without having to rotate the rotating shaft. Accordingly, the tension of the saw chain may be fine-adjusted and work for replacing the saw chain may be facilitated.

BRIEF DESCRIPTION OF DRAWINGS

FIG. 6 shows a diagram of the adjusting pin sliding along an external thread portion 48a.

FIG. 7 shows a diagram of the adjusting pin sliding along the external thread portion 48a.

FIG. 8 shows a diagram of the adjusting pin sliding along the external thread portion 48a.

FIG. 9 shows a diagram of the adjusting pin sliding along the external thread portion 48a.

DESCRIPTION OF EMBODIMENT

Figure 1:
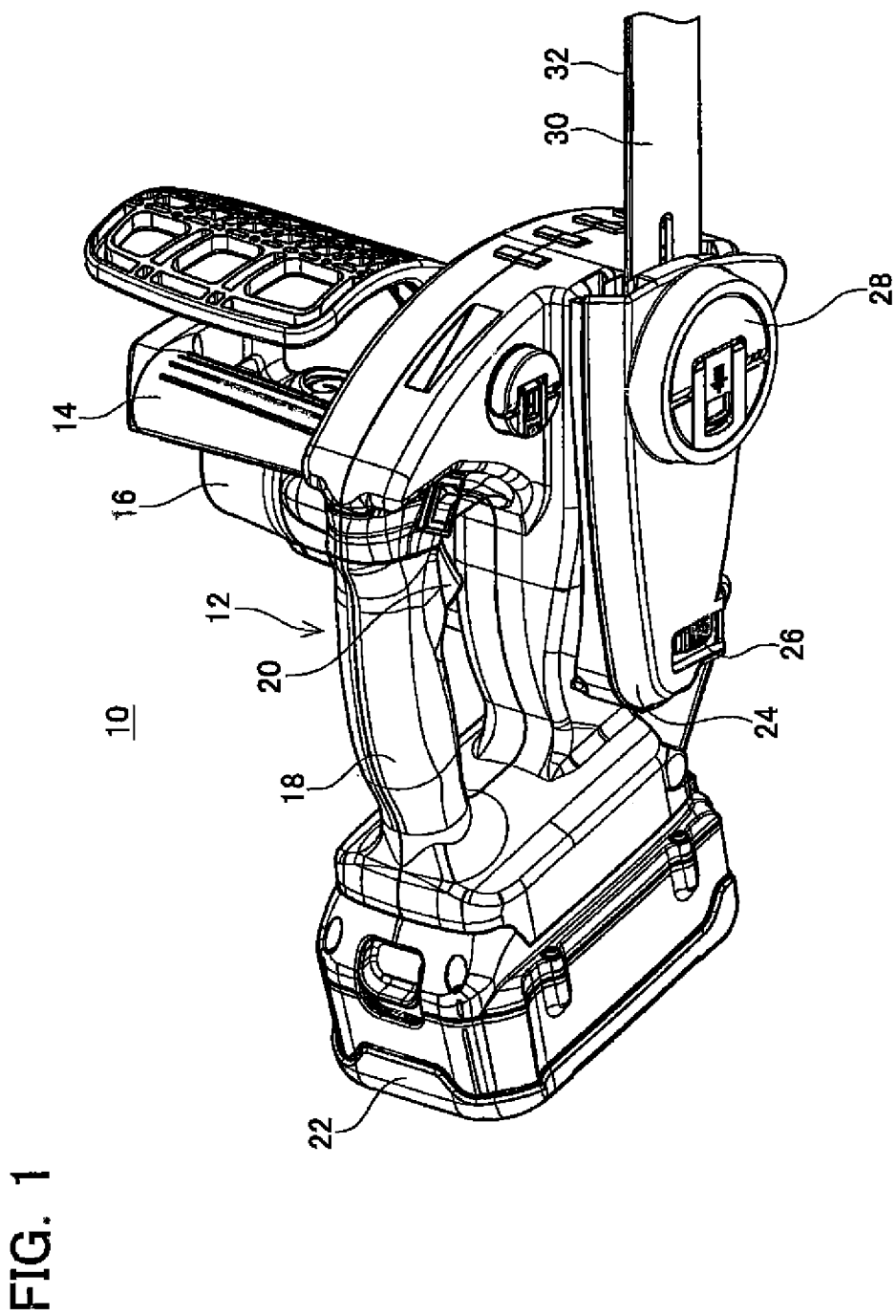
FIG. 1 shows an external view of a chain saw.
Figure 2:
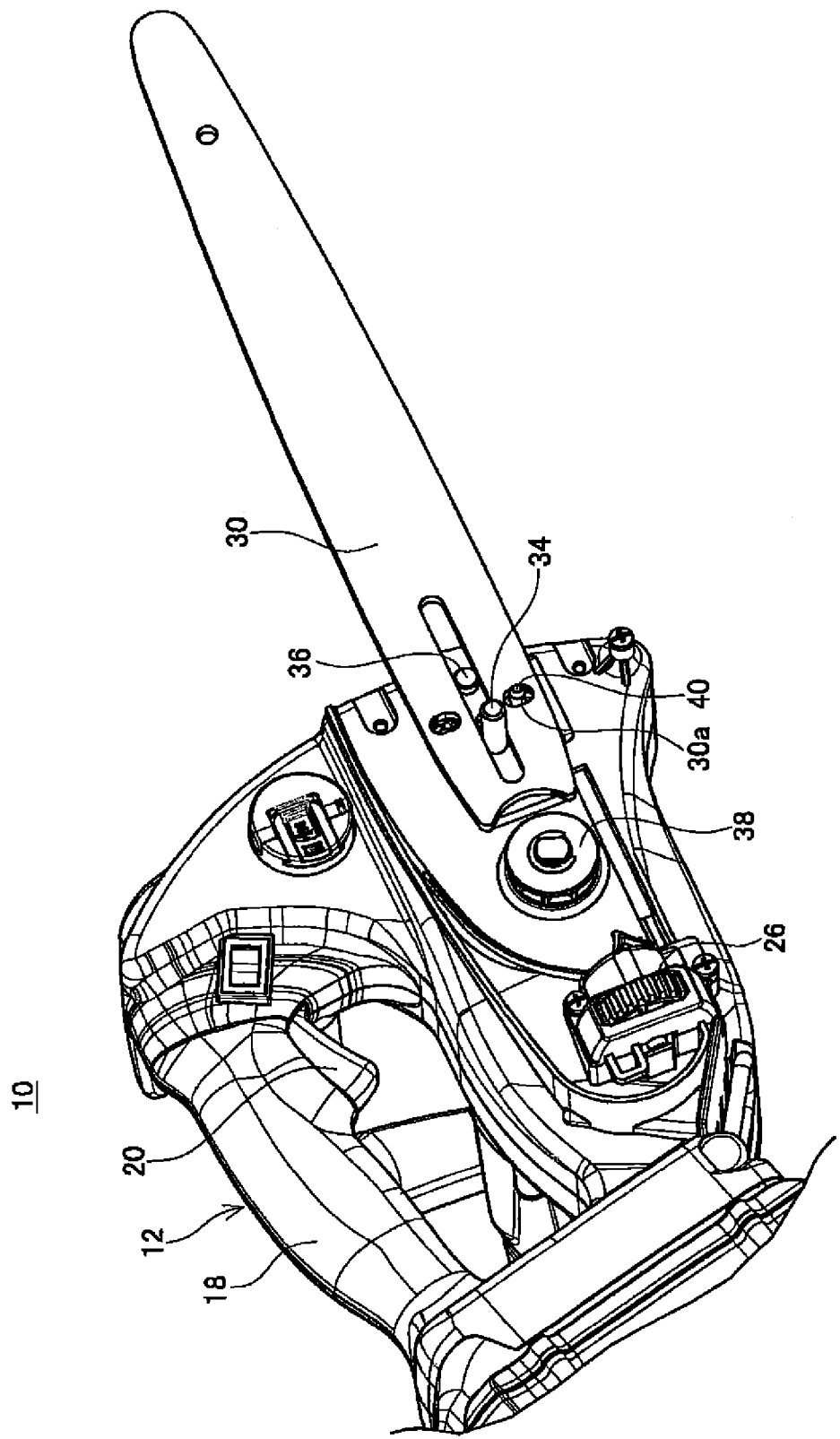
FIG. 2 shows an external view of a part of the chain saw.

An embodiment will now be described with reference to the drawings. FIG. 1 shows an external view of a chain saw 10. FIG. 2 shows an external view of the chain saw 10 in a state in which a cover 24 and a saw chain 32 have been removed from a body 12 which will be described later. The chain saw 10 comprises the body 12, a guide bar 30 attached to the body 12, and the saw chain 32.

As shown in FIGS. 1 and 2, the body 12 comprises a motor 16, a first grip 14, a second grip 18, and a sprocket 38. A trigger switch 20 that activates the chain saw 10 is arranged on the second grip 18. The sprocket 38 is arranged on a side surface of the body 12 and is rotatably supported by the body 12. The sprocket 38 is connected to the motor 16 and is rotatably driven by the motor 16. The motor 16 is configured so that power is supplied to the motor 16 from a battery 22 in conjunction with an operation performed on the trigger switch 20. The battery 22 is detachably attached to the body 12.

The guide bar 30 is attached to the body 12. The guide bar 30 is arranged adjacent to the sprocket 38. The guide bar 30 is supported against the body 12 by a supporting bolt 34 and a supporting pin 36. The supporting bolt 34 and the supporting pin 36 are fixed to the body 12 and support the guide bar 30 so that the guide bar 30 is capable of moving reciprocally relative to the body 12. In other words, the guide bar 30 is arranged capable of approaching/separating from the sprocket 38. The guide bar 30 is moved by a linear motion mechanism 50, which will be described later. The saw chain 32, not shown in FIG. 2, is provided with tension between the sprocket 38 and the guide bar 30. By causing the guide bar 30 to approach/separate from the sprocket 38, the operator can adjust the tension of the saw chain 32.

A cover 24 that covers the sprocket 38 and a fixed operating knob 28 for fixing the guide bar 30 are arranged on a side surface of the body 12. The fixed operating knob 28 is screwed onto the supporting bolt 34 that projects from a side surface of the body 12. When the fixed operating knob 28 is tightened relative to the supporting bolt 34, the guide bar 30 becomes fixed to the body 12, and when the fixed operating knob 28 is loosened relative to the supporting bolt 34, the guide bar 30 becomes capable of moving reciprocally relative to the body 12. The cover 24 is fixed by the fixed operating knob 28. The cover 24 can be detached from the body 12 by detaching the fixed operating knob 28 from the supporting bolt 34.

Next, operations of the chain saw 10 will be described. When the operator turns on the trigger switch 20, the motor 16 that is a power source drives. Due to driving of the motor 16, the sprocket 38 is rotationally driven relative to the body 12. Consequently, the saw chain 32 that is a tool rotates along the sprocket 38 and the guide bar 30.

Figure 3:
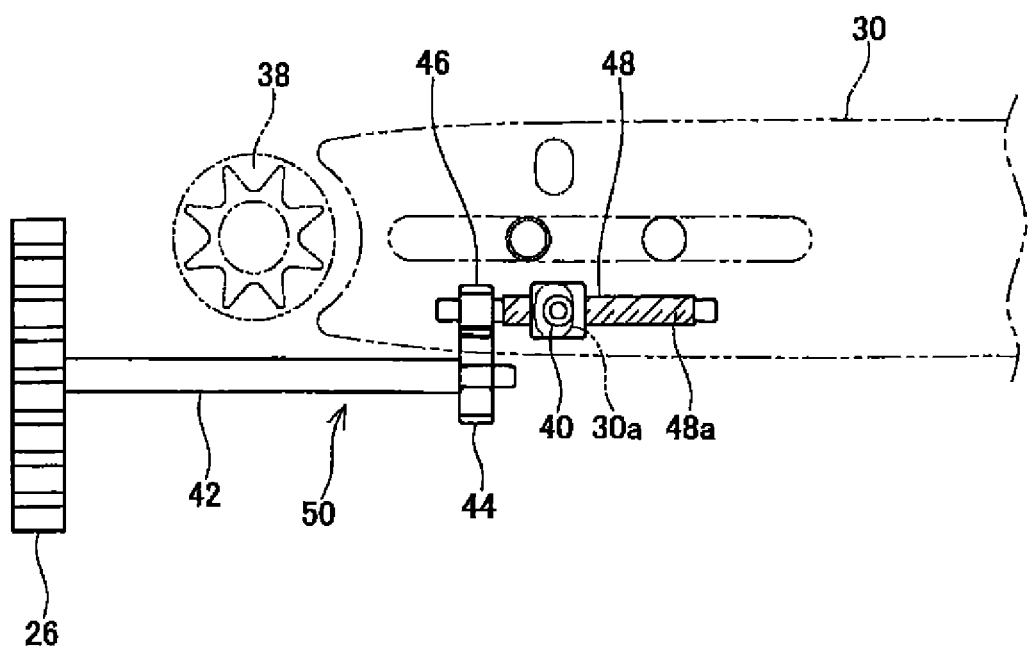
FIG. 3 shows an external view of a linear motion mechanism.

Next, the linear motion mechanism 50 that moves the guide bar 30 will be described. FIG. 3 shows an external view of the linear motion mechanism 50 attached to the chain saw 10. The linear motion mechanism 50 comprises a first shaft 42, a second shaft 48, an adjusting pin 40, and a wheel 26.

The first shaft 42 is rotatably supported by the body 12. The wheel 26 is fixed to one end of the first shaft 42. A part of the wheel 26 is exposed to an outside of the cover 24 (refer to FIG. 1). The first shaft 42 extends parallel to the guide bar 30 from the wheel 26. A drive gear 44 is fixed to another end of the first shaft 42.

The second shaft 48 is rotatably supported by the body 12. The second shaft 48 is arranged parallel to the first shaft 42. A driven gear 46 that engages with the drive gear 44 of the first shaft 42 is fixed to one end of the second shaft 48. An external thread portion 48a is formed in a central part of the second shaft 48. The adjusting pin 40 engages with the external thread portion 48a. According to the configuration described above, the linear motion mechanism 50 is structured so that the adjusting pin 40 moves along the second shaft 48 with a rotation of the wheel 26.

Figure 4:
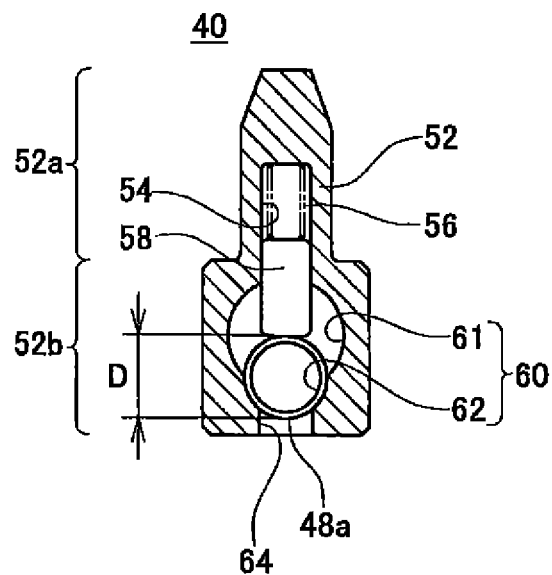
FIG. 4 shows a longitudinal sectional view of an adjusting pin when an external thread portion and an inner thread part engage with each other.
Figure 5:
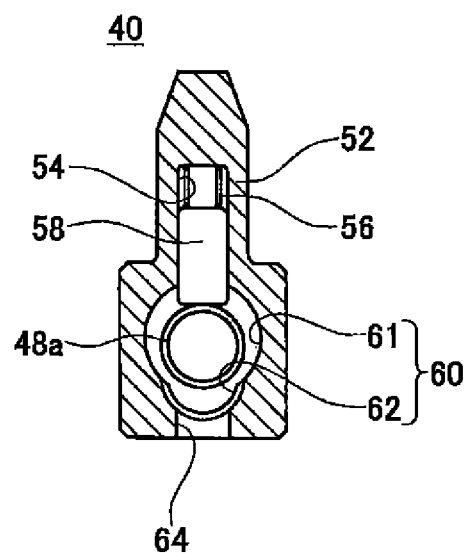
FIG. 5 shows a longitudinal sectional view of the adjusting pin when the external thread portion and the inner thread part separate from each other.

FIGS. 4 and 5 show longitudinal sectional views of the adjusting pin 40. The adjusting pin 40 comprises a body 52. The body 52 of the adjusting pin 40 comprises a base portion 52b and an engaging pin 52a. The engaging pin 52a is inserted into an engaging hole 30a of the guide bar 30 and engages with the guide bar 30 (refer to FIG. 3).

An opening 60 into which the external thread portion 48a of the second shaft 48 is inserted is formed on the base portion 52b. A cross-sectional shape of the opening 60 comprises a large diameter part 61 and an inner thread part 62. The large diameter part 61 has a greater diameter than an outer diameter D of the external thread portion 48a. The inner thread part 62 has a half-round shape. A screw groove that engages with the external thread portion 48a of the second shaft 48 is formed on the inner thread part 62. The inner thread part 62 is positioned on a side opposite to the engaging pin 52a with respect to the large diameter part 61. Due to the cross-sectional shape of the opening 60 described above, the adjusting pin 40 is capable of moving between a first position shown in FIG. 4 and a second position shown in FIG. 5 in a radial direction of the second shaft 48. As shown in FIG. 4, when the adjusting pin 40 is at the first position, the inner thread part 62 of the adjusting pin 40 engages with the external thread portion 48a of the second shaft 48. On the other hand, as shown in FIG. 5, when the adjusting pin 40 is at the second position, the engagement between the inner thread part 62 and the external thread portion 48a is released.

A spring 56 and a pressing pin 58 are arranged on the body 52 of the adjusting pin 40. The spring 56 and the pressing pin 58 are stored in a storing hole 54 formed on the body 52. The storing hole 54 is formed inside the engaging pin 52a and communicates with the opening 60. The spring 56 is in a compressed state and the pressing pin 58 is biased toward an opening 60 side by a repulsive force of the spring 56. An outer diameter of the pressing pin 58 is smaller than the storing hole 54 and the pressing pin 58 is capable of sliding relative to the storing hole 54.

An inserting hole 64 is formed coaxially with the storing hole 54 on the base portion 52b on an opposite side to the engaging pin 52a. The inserting hole 64 communicates with the storing hole 54 via the opening 60. The inserting hole 64 has an inner diameter that is approximately equal to the storing hole 54. The inner diameters of the storing hole 54 and the inserting hole 64 are smaller than the outer diameter D of the external thread portion 48a. The adjusting pin 40 is fabricated by inserting the spring 56 and the pressing pin 58, in this order, into the inserting hole 64.

As shown in FIG. 4, the pressing pin 58 receives a biasing force of the spring 56 and presses the external thread portion 48a inserted into the opening 60. Receiving a reaction force of the biasing force, the adjusting pin 40 is biased toward the first position. In other words, the spring 56 biases the adjusting pin 40 from the external thread portion 48a toward an outside of the body 12. Accordingly, during normal operation, the adjusting pin 40 is retained at the first position.

On the other hand, when the adjusting pin 40 is pushed toward the body 12, the spring 56 elastically deforms and the adjusting pin 40 moves to the second position as shown in FIG. 5. At this point, the external thread portion 48a and the inner thread part 62 separate from each other and the engagement between the two is released. In the state shown in FIG. 5, since the external thread portion 48a and the inner thread part 62 are not engaged with each other, the adjusting pin 40 can be moved freely along the external thread portion 48a.

As shown in FIG. 4, in a normal state, the external thread portion 48a engages with the inner thread part 62. When the operator rotates the wheel 26, the first shaft 42 is rotated. When the first shaft 42 rotates, the second shaft 48 is rotated via the drive gear 44 and the driven gear 46. Consequently, the adjusting pin 40 moves along the external thread portion 48a. The guide bar 30 that is engaged with the adjusting pin 40 moves so as to follow the adjusting pin 40. According to this configuration, the operator can cause the guide bar 30 to approach/separate from the sprocket 38 and adjust the tension of the saw chain 32.

FIGS. 6 to 9 show the adjusting pin 40 being moved along the external thread portion 48a without operating the wheel 26. FIGS. 6 to 9 are cross-sectional views showing longitudinal cross sections perpendicular to the cross sections shown in FIGS. 4 and 5. For example, when replacing the saw chain 32, the saw chain 32 is removed after sufficiently relaxing the tension of the saw chain 32. In such a case, with the chain saw 10 according to the present embodiment, the adjusting pin 40 can be moved widely by a procedure described below.

Figure 6:
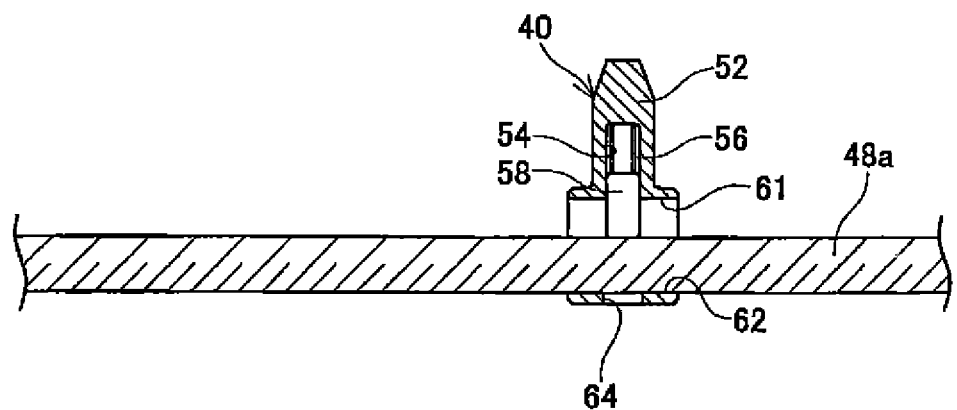
Figure 7:
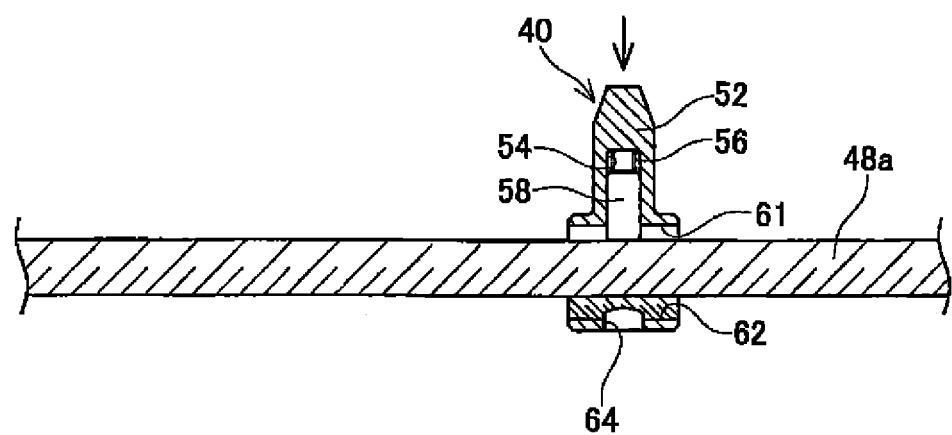
Figure 8:
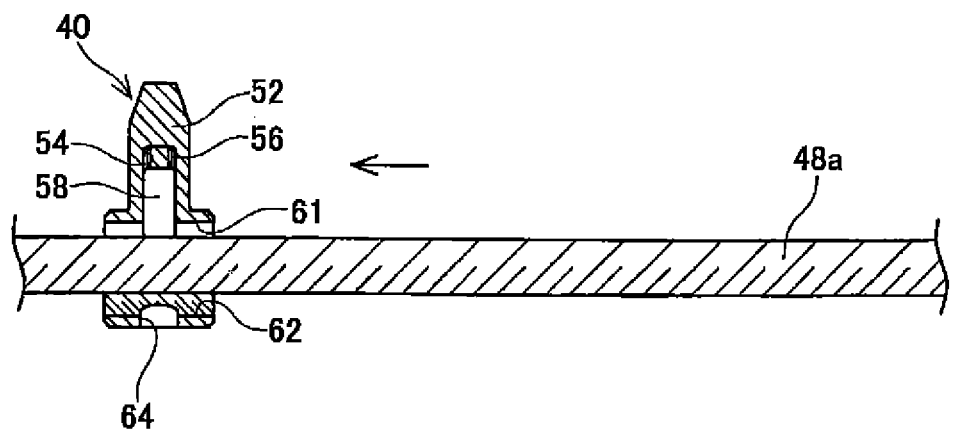
Figure 9:
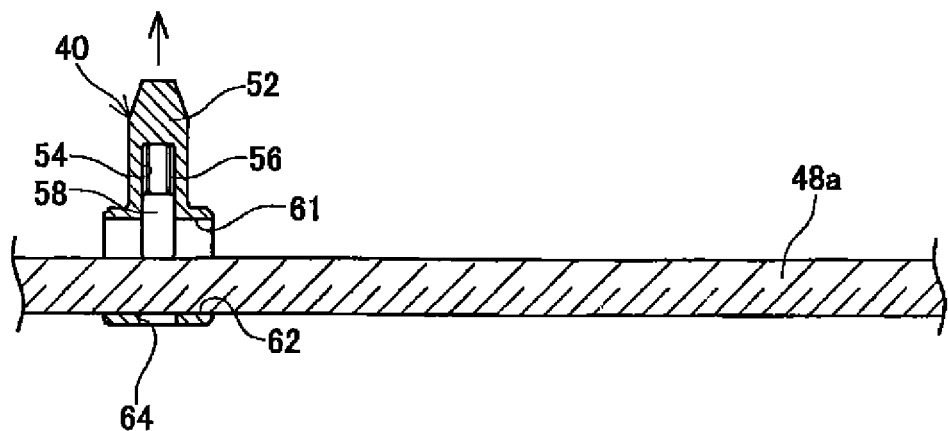

FIG. 6 shows a normal state in which the adjusting pin 40 is retained at the first position, and the external thread portion 48a and the inner thread part 62 are engaged with each other. From the state shown in FIG. 6, the operator pushes the adjusting pin 40 toward the body 12 or, in other words, toward the external thread portion 48a. When the operator pushes the adjusting pin 40 toward the body 12, as shown in FIG. 7, the adjusting pin 40 moves to the second position and the external thread portion 48a and the inner thread part 62 separate from each other. In this state, the adjusting pin 40 is capable of moving freely relative to the external thread portion 48a. Therefore, the operator can move the adjusting pin 40 widely toward the sprocket 38 as shown in FIG. 8 without having to operate the wheel 26. Consequently, the guide bar 30 and the sprocket 38 approach each other. As a result, the saw chain 32 can be removed from the guide bar 30. When the operator unloads the pressing force acting on the adjusting pin 40 after moving the adjusting pin 40, as shown in FIG. 9, the adjusting pin 40 returns to the first position and the external thread portion 48a and the inner thread part 62 reengage with each other. Moreover, after replacing the saw chain 32, by executing the procedure from FIG. 6 to FIG. 9 in an opposite order, the saw chain 32 is provided with tension between the guide bar 30 and the sprocket 38.

As described above, the chain saw 10 according to the present embodiment comprises a linear motion mechanism 50. With the linear motion mechanism 50, the adjusting pin 40 can be moved freely relative to the external thread portion 48a without having to operate the wheel 26. Accordingly, when replacing the saw chain 32, the operator can remove and attach the saw chain 32 without having to rotate the wheel 26 many times.

Specific embodiment of the present teachings is described above, but this merely illustrates some representative possibilities for utilizing the teachings and does not restrict the claims thereof. The subject matter set forth in the claims includes variations and modifications of the specific examples set forth above.

Figure 10:
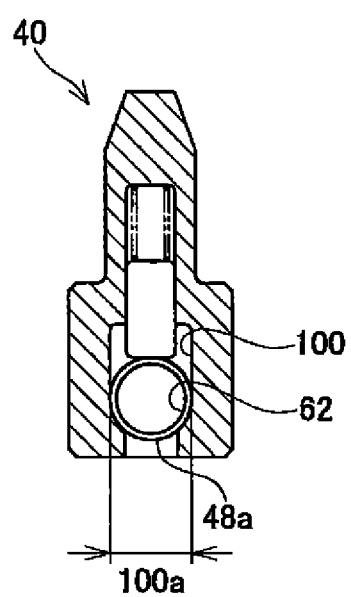
FIG. 10 shows a longitudinal sectional view of an adjusting pin according to a modification.

For example, the opening 60 according to the embodiment described above has a cross-sectional shape comprising a large diameter part 61 and an inner thread part 62. However, a cross-sectional shape of an opening arranged on the adjusting pin 40 is not limited thereto. For example, an opening 100 shown in FIG. 10 may be adopted. The opening 100 has a cross-sectional shape having a width 100a that is greater than the outer diameter D of the external thread portion 48a. An inner thread part 62 is formed on an end of the opening 100 on an opposite side to the engaging pin 52a. A similar advantageous effect to the embodiment described above can also be achieved by this configuration.

In addition, in the embodiment described above, the spring 56 and the pressing pin 58 retain the adjusting pin 40 at the first position at which the external thread portion 48a and the inner thread part 62 engage with each other. However, a configuration that retains the adjusting pin 40 at the first position is not limited thereto. For example, the adjusting pin 40 may be retained at the first position by a pin or the like which is fitted into a clearance between an outer surface of the external thread portion 48a and an inner surface of the opening 60 in a state where the adjusting pin 40 is at the first position.

The technical elements disclosed in the specification or the drawings may be utilized separately or in all types of combinations, and are not limited to the combinations set forth in the claims at the time of filing of the application. Furthermore, the subject matter disclosed herein may be utilized to simultaneously achieve a plurality of objects or to only achieve one object.

The invention claimed is:

1. A chain saw comprising:
a chain saw body;
a linear motion mechanism disposed on the chain saw body;
a guide bar attached to the chain saw body and being capable of moving reciprocally relative to the chain saw body; and
a saw chain provided with tension between the chain saw body and the guide bar,
wherein the linear motion mechanism comprises:
a rotating shaft comprising an external thread portion at least at a part of an area in a length direction; and
a linear motion member engaging with the guide bar and comprising an opening through which the external thread portion of the rotating shaft passes,
wherein the opening of the linear motion member has a cross-sectional shape that enables the linear motion member to move between a first position and a second position along a radial direction of the rotating shaft, an inner thread is formed on an inner surface of the opening, the inner thread engages with the external thread of the rotating shaft when the linear motion member moves to the first position, and the engagement between the inner thread and the external thread is released when the linear motion member moves to the second position, and the linear motion member comprises a retaining unit capable of retaining the linear motion member at the first position.

2. The chain saw as in claim 1, wherein the retaining unit comprises an elastic member biasing the linear motion member toward the first position.

3. The chain saw as in claim 2, wherein the elastic member retains the linear motion member in the first position by biasing the linear motion member from the rotating shaft toward an outer side of the chain saw body, and the linear motion member moves to the second position by being pressed toward the rotating shaft from the outer side of the chain saw body.

* * * * *